(12) United States Patent
Hoffmuller et al.

(10) Patent No.: US 12,371,579 B2
(45) Date of Patent: Jul. 29, 2025

(54) METHOD FOR PRODUCING EFFECT PIGMENTS

(71) Applicant: GIESECKE+DEVRIENT CURRENCY TECHNOLOGY GMBH, Munich (DE)

(72) Inventors: Winfried Hoffmuller, Bad Tolz (DE); Michael Sobol, Munich (DE); Axel Von Clausbruch, Bad Tolz (DE); Tobias Rudisch, Schliersee (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 814 days.

(21) Appl. No.: 17/631,963

(22) PCT Filed: Jul. 27, 2020

(86) PCT No.: PCT/EP2020/025348
§ 371 (c)(1),
(2) Date: Feb. 1, 2022

(87) PCT Pub. No.: WO2021/023395
PCT Pub. Date: Feb. 11, 2021

(65) Prior Publication Data
US 2022/0289989 A1 Sep. 15, 2022

(30) Foreign Application Priority Data
Aug. 2, 2019 (DE) .................. 10 2019 005 456.3

(51) Int. Cl.
| | |
|---|---|
| C09D 11/037 | (2014.01) |
| C09C 1/00 | (2006.01) |
| C09C 1/62 | (2006.01) |
| C09C 1/64 | (2006.01) |
| C09D 5/33 | (2006.01) |
| C09D 11/106 | (2014.01) |
| C09D 11/14 | (2006.01) |

(52) U.S. Cl.
CPC .......... *C09D 11/037* (2013.01); *C09C 1/0015* (2013.01); *C09C 1/62* (2013.01); *C09C 1/627* (2013.01); *C09C 1/64* (2013.01); *C09D 5/004* (2013.01); *C09D 11/106* (2013.01); *C09D 11/14* (2013.01); *C01P 2004/20* (2013.01)

(58) Field of Classification Search
CPC .................................................. C09D 11/037
See application file for complete search history.

(56) References Cited

U.S. PATENT DOCUMENTS

| | | | |
|---|---|---|---|
| 4,321,087 A | 3/1982 | Levine et al. | |
| 5,354,099 A | 10/1994 | Kaule et al. | |
| 5,599,047 A | 2/1997 | Kaule et al. | |
| 5,803,503 A | 9/1998 | Kaule et al. | |
| 6,318,758 B1 | 11/2001 | Stenzel et al. | |
| 6,454,166 B1 | 9/2002 | Stenzel et al. | |
| 2002/0056758 A1 | 5/2002 | Stenzel et al. | |

FOREIGN PATENT DOCUMENTS

| | | |
|---|---|---|
| DE | 4041025 A1 | 6/1992 |
| EP | 0227423 B1 | 6/1992 |
| EP | 0516790 A1 | 12/1992 |
| WO | 9211142 A1 | 7/1992 |
| WO | 9723357 A1 | 7/1997 |
| WO | 9913157 A1 | 3/1999 |
| WO | WO-03046245 A2 * | 6/2003 ............ B22F 1/0055 |
| WO | 2005051675 A2 | 6/2005 |
| WO | 2010069823 A1 | 6/2010 |
| WO | 2011064162 A2 | 6/2011 |
| WO | 2013186167 A2 | 12/2013 |
| WO | 2018210597 A1 | 11/2018 |

OTHER PUBLICATIONS

International Search Report with Written Opinion from PCT Application No. PCT/EP2020/025348, Nov. 2, 2020.

\* cited by examiner

*Primary Examiner* — Tabatha L Penny
(74) *Attorney, Agent, or Firm* — Workman Nydegger

(57) ABSTRACT

A method for manufacturing platelet-shaped effect pigments includes the steps of a) providing a carrier substrate; b) applying aqueous washing ink droplets to the carrier substrate in first regions forming a first motif; c) applying a reflective coating to the carrier substrate such that a reflective coating is deposited on the carrier substrate in the form of a regular contiguous grid in second regions forming a second motif outside the first regions forming the first motif, wherein the first regions form the first motif and have the washing ink droplets form regular islands within the regular contiguous grid, and a reflective coating is deposited above the washing ink droplets in the first regions forming the first motif; and d) removing the washing ink droplets in the first regions together with the reflective coating present thereon and isolating the removed reflective coating in the form of platelet-shaped effect pigments.

10 Claims, 3 Drawing Sheets

METHOD FOR PRODUCING EFFECT PIGMENTS

BACKGROUND

The invention relates to a method for producing effect pigments.

Effect pigments, in particular so-called color-shifting effect pigments, which have a change in color when the viewing angle is changed, are based e.g. on a multilayer structure such as a Cr/SiO$_2$/Al/SiO$_2$/Cr multilayer structure or an Al/SiO$_2$/Al/SiO$_2$/Al multilayer structure. The central Al layer acts as a reflector, the terminal metallic layers each have the function of an absorber layer, wherein a dielectric spacer layer is present in each case between the reflector and the absorber. Such effect pigments are generally manufactured in such a manner that the desired multilayer structure is initially produced over a large area, e.g. by means of vapor deposition on a foil. The multilayer structure is subsequently separated from the foil. The separation of the multilayer structure can be facilitated in that the foil is initially supplied with a suitable release layer. The multilayer structure obtained in this manner is finally comminuted into individual pigments. EP 0 227 423 B1, for example, describes the manufacture of an optically variable coating with the steps of providing a flexible web on which a release layer is applied, the subsequent application of an optically variable, multilayer interference coating, the detachment of the interference coating from the flexible web by means of a suitable solvent and breaking the interference coating into individual pigments.

In the manufacture described above, the multilayer structure is detached from the foil in an uncontrolled manner, which leads to pigments with a broad size distribution. Furthermore, the grinding of the multilayer structure to pigments leads to fresh, irregular broken edges and to a fine fraction which is unfavorable for the color brilliance and which has to be separated from the rest of the mixture. In addition, a large amount of solvent is required for the process.

It is the object of the present invention to improve the manufacturing method known in the prior art.

This object is achieved by the combination of features defined in the independent claim. Developments of the invention are the subject matter of the subclaims.

SUMMARY OF THE INVENTION 1. (First aspect of the invention) A method for manufacturing platelet-shaped effect pigments (5), comprising the following steps of:
a) providing a carrier substrate (1);
b) applying by printing technology in a controlled manner aqueous washing ink droplets (2) to the carrier substrate (1) in first regions (3) forming a first motif;
c) applying a reflective coating (5, 6) to the carrier substrate, so that in second regions (4) forming a second motif outside the first regions (3) forming a first motif, reflective coating (6) is deposited on the carrier substrate (1) in the form of a regular, contiguous grid, wherein the first regions (3) forming a first motif and having the washing ink droplets (2) form regular islands within the regular, contiguous grid; in the first regions (3) forming a first motif reflective coating (5) is deposited above the washing ink droplets (2);
d) removing the washing ink droplets (2) in the first regions (3) together with the reflective coating (5) present thereon and isolating the removed reflective coating (5) in the form of platelet-shaped effect pigments (5), wherein the remaining carrier substrate (1) is constituted such that it has a reflective coating (6) in the form of a regular, contiguous grid only in the second regions (4) forming a second motif 2. (Preferred embodiment) The method according to clause 1, wherein step b), namely applying by printing technology in a controlled manner aqueous washing ink droplets (2) to the carrier substrate (1) in first regions (3) forming a first motif, takes place by means of a printing cylinder having a cell grid or a printing plate having a cell grid, wherein the geometry of the platelet-shaped effect pigments (5) produced in the method is determined by a suitable choice of the parameters of cell arrangement, areal cell geometry, cell depth and web width.

3. (Preferred embodiment) The method according to clause 2, wherein the printing cylinder or the printing plate has a plurality of different cell grid regions, wherein the cell grid regions differ from one another in at least one of the parameters of cell arrangement, areal cell geometry, cell depth and web width, so that the platelet-shaped effect pigments (5) produced in the method have a plurality of platelet-shaped effect pigments (5) with different geometries corresponding to the plurality of different cell grid regions.

4. (Preferred embodiment) The method according to any of clauses 1 to 3, wherein the aqueous washing ink droplets (2) in step b) are based on an aqueous washing ink having a binding agent, wherein the binding agent preferably is a polymer and the polymer is particularly preferably chosen from the group composed of hydroxyethyl cellulose, hydroxypropyl cellulose, carboxymethyl cellulose, polyvinyl alcohol, in particular with a low molecular weight and with a medium degree of hydrolysis, polyvinyl pyrrolidone, polyethylene glycol and casein.

5. (Preferred embodiment) The method according to any of clauses 1 to 4, wherein between the steps b) and c) a drying of the aqueous washing ink droplets (2) applied to the carrier substrate (1) is carried out.

6. (Preferred embodiment) The method according to any of clauses 1 to 5, wherein in step a) a foil is provided as the carrier substrate.

7. (Preferred embodiment) The method according to any of clauses 1 to 6, wherein the reflective coating (5, 6) applied in step c), and thus each of the platelet-shaped effect pigments (5) isolated in step d), is a metallization, preferably a metallization chosen from the group composed of aluminum, stainless steel, nichrome, gold, silver, platinum and copper.

8. (Preferred embodiment) The method according to any of clauses 1 to 6, wherein the reflective coating (5, 6) applied in step c), and thus each of the platelet-shaped effect pigments (5) isolated in step d), has a multilayer arrangement, preferably a multilayer arrangement with the layer sequence:

semi-transparent absorber layer/dielectric spacer layer/reflective layer; or semitransparent absorber layer/dielectric spacer layer/reflective layer/dielectric spacer layer/semitransparent absorber layer.

9. (Preferred embodiment) The method according to clause 8, wherein the reflective coating (5, 6) applied in step c), and thus each of the platelet-shaped effect pigments (5) isolated in step d), has a multilayer arrangement with the layer sequence semitransparent absorber layer/dielectric spacer layer/reflective layer, namely a Cr/SiO$_2$/Al multilayer arrangement.

10. (Preferred embodiment) The method according to clause 8, wherein the reflective coating (5, 6) applied in step c), and thus each of the platelet-shaped effect pigments (5) isolated in step d), has a multilayer arrangement with the layer sequence semitransparent absorber layer/dielectric spacer layer/reflective layer/dielectric spacer layer/semitransparent absorber layer, namely a Cr/SiO$_2$/Al/SiO$_2$/Cr multilayer arrangement or an Al/SiO$_2$/Al/SiO$_2$/Al multilayer arrangement, wherein in the case of the Al/SiO$_2$/Al/SiO$_2$/Al multilayer arrangement, the central Al layer has a greater layer thickness than each of the two terminal Al layers.

DETAILED DESCRIPTION OF THE INVENTION

The present invention is based on the idea of making use of the technology known in the field of manufacturing security elements for value documents of using a washing ink for the fine structuring of metallizations in providing desired platelet-shaped effect pigments.

Security elements with characters that are visually recognizable in transmitted light and possibly also in incident light are known. The characters can have any shape, such as numbers, letters, patterns, geometric or figurative representations, etc., and are generally referred to as "negative writing" regardless of their shape. The security elements are e.g. manufactured by a transparent substrate being supplied with a coating, generally a metallic coating (or metallization), which is then removed again at certain points. When the security element is held up to the light, the regions with a metallic or other coating appear dark. The regions from which the coating was removed, on the other hand, appear light or at least significantly lighter than the coated regions, depending on the transparency of the substrate. The more transparent, i.e. the more light-transmissive, the carrier substrate is, the more pronounced the contrast between coated and uncoated regions is. In the case of very transparent substrates, the negative writing is not only clearly recognizable in transmitted light, but also in incident light.

In the case of vapor deposition processes, metallic coatings are substantially created over the full area. Providing recesses within the metallic coating can in the simplest case take place by inserting a screen or a shielding plate during the vaporization process. This measure only leads to coarsely structured metallizations. Visually appealing security elements, however, require fine structuring. Finely structured metallizations can take place e.g. by a so-called washing method. WO 99/13157 A1 describes a washing method in which a carrier foil is printed in the form of characters with a printing ink with a high pigment content, coated with a thin cover layer (e.g. of aluminum), and subsequently the printing ink is removed together with the cover layer disposed above it by washing out with a liquid in order to produce coating-free regions in the form of the characters.

WO 92/11142 A1 (corresponds to EP 0 516 790 A1) or its German priority application DE 4 041 025 A1 discloses printing inks that can be activated by the action of heat, for example waxy emulsions. When heated, these emulsions soften and thereby reduce the adhesion to the carrier foil, so that in these poorly adhering regions, supported by mechanical treatment, such as ultrasound, brushing or rubbing, both the softened printing ink and the overlying layers can be removed. In addition, inks with foaming additives, as are customary in the production of plastic foams, are disclosed as activatable printing inks. These expanding agents split off gas under the action of heat and produce foam structures. This increases the volume of the printing ink, whereby the adhesion on the carrier foil is reduced and the layers overlying the printing ink are curved outwards so that they offer a good point of attack for mechanical removal.

WO 97/23357 A1 makes reference to EP 0 516 790 A1 and in addition discloses activatable printing inks which are activated, i.e. washed out, by treatment with a suitable solvent.

The present invention is based on the finding that in experiments with washing ink compositions containing solvents, the wetting of the carrier substrate to be wetted became poorer in line with an increase of the water content of the washing ink. Surprisingly, a suitable choice of the water content can produce such a solubility state in which the washing ink can be applied to the carrier substrate by printing technology in the form of a quasi-standing grid that does not run any further due to the surface energy conditions. The webs of the printing cylinder or printing plate employed separate the washing ink droplets printed on the carrier substrate in a manner geometrically corresponding to the cells of the printing cylinder or printing plate. This is followed by the step of applying a reflective coating, e.g. a metallization or a multilayer arrangement, in particular a multilayer arrangement producing a color-shifting thin-film element. This is followed by the washing out step, namely the removal of the washing ink droplets together with the reflective coating present thereon, followed by the isolation of the reflective coating that has been removed, in order to provide platelet-shaped effect pigments in this manner.

In the washing out step, use is made of the solubility of the binding agent contained in the washing ink, in particular a polymer, in the washing medium. The reflective coating deposited on the washing ink regions is removed in the washing process together with the binding agent and possibly further particles contained in the washing ink, in order to provide the desired platelet-shaped effect pigment in this manner. What remains is the carrier substrate, on which the vaporized grid of reflective coating remains largely undamaged in the regions not previously coated with washing ink.

Through a suitable choice of the parameters of cell arrangement or rasterization, areal cell geometry (i.e. the dimensions, such as length and width, of the respective cell in the plane of the printing plate or the printing cylinder), cell depth, the shape of the cell in depth, and web width, the geometry of the network of reflective coating remaining in the method, and thus the geometry of the isolated platelet-shaped effect pigments, can be regulated. The network of reflective coating remaining after removal by means of washing out and isolating the platelet-shaped pigments does not have a statistical or random grid structure, but a defined grid structure with a defined line width and defined line structure. The platelet-shaped pigments produced correspond to the island regions surrounded by the grid lines. The pigment size is very constant and lies within a narrow distribution.

Since the printing cylinder or printing plate used can have a plurality of regions with different cell arrangements and/or cell geometries, two or more types of platelet-shaped pigments with respectively different, defined pigment size, can be produced without any problems.

With reference to the binding agent contained in the washing ink, any one of the substances is generally suitable that are used in the state of the art cited above with reference to the washing method. Polymers which have good solubility both in water and in organic solvents, typically alcohols and/or esters have been found to be particularly advantageous for the method according to the invention. Examples of such binding agents are hydroxyethyl cellulose, hydroxypropyl cellulose, carboxymethyl cellulose, polyvinyl alcohol, in particular with a low molecular weight and with a medium degree of hydrolysis, polyvinyl pyrrolidone, polyethylene glycol and casein.

With reference to the carrier substrate remaining in the manufacturing method, on which the vapor-deposited grid of reflective coating remains largely undamaged in the regions not previously coated with washing ink, the metallic line thicknesses obtained at the end of the manufacturing method are e.g. in the range from 1 μm to 50 μm, wherein the lines are usually so fine that they can only be recognized as lines when using a magnifying glass. The island regions within the remaining grid structure, i.e. the regions initially coated with washing ink and thus the platelet-shaped effect pigments obtained according to the method, have a length e.g. a dimension in a range from 2 μm to 150 μm.

According to a preferred embodiment for manufacturing the platelet-shaped effect pigments, aqueous washing ink droplets are applied by printing technology in a controlled manner to a carrier substrate, such as a foil, in first regions forming a first motif. The term "controlled" hereby denotes a regular spacing of the individual washing ink droplets. The application by printing technology can preferably take place by means of a gravure printing plate or a flexographic printing plate, which has individual cells at regular spacing. Alternatively, individual cell groups can be present, e.g. groups composed of seven, hexagonally arranged cells, wherein the cell groups are arranged so as to be regularly spaced from one another. Instead of a printing plate, a printing cylinder can also be used. Subsequently e.g. the application of a metallization takes place, so that in second regions forming a second motif outside of the first regions forming a first motif, metal is deposited on the carrier substrate in the form of a regular, metallic, contiguous grid, wherein the first regions forming a first motif and having the washing ink droplets form regular islands within the regular, metallic, contiguous grid. In the first regions forming a first motif, metal is deposited above the washing ink droplets. Afterwards, the removal of the washing ink droplets in the first regions together with the metal present thereon and the isolation of the metal take place in order to provide platelet-shaped effect pigments in this manner.

The method for removing the washing ink advantageously takes place by dissolving with a suitable solvent. Here e.g. water, aqueous solutions, mixtures of solvents and water, possibly with surfactants, possibly with defoamers and other additives are used. The detachment or dissolution can also be supported by spray nozzles or also mechanically by brushes, rollers or felts. The choice of solvent is expediently made in coordination with the coating. In addition to water, the following solvents can typically be used: methyl acetate, ethyl acetate, propyl acetate, butyl acetate, methoxypropyl acetate, acetone, methyl ethyl ketone, methyl isobutyl ketone, cyclopentanone, cyclohexanone, methylene chloride, chloroform, toluene, xylene, methanol, ethanol, 2-propanol. It is also possible to use acetals or mixtures of the above-mentioned solvents.

GENERAL REMARKS

In the simplest case, the reflective coating of the platelet-shaped effect pigments obtained according to the invention can be based on a single metallization. Elements such as aluminum, stainless steel, nichrome, gold, silver, platinum and copper are suitable as metals. Platelet-shaped metal pigments which are particularly suitable for producing a reflective layer obtainable by printing technology are known from e.g. WO 2013/186167 A2, WO 2010/069823 A1, WO 2005/051675 A2 and WO 2011/064162 A2.

The reflective coating of the platelet-shaped effect pigments obtained according to the invention can furthermore have a multilayer structure, e.g. an interference layer structure, which takes on a different hue depending on the viewing angle. Such an interference layer structure is typically based on a reflective layer, a partially transparent layer or absorber layer and an interposed dielectric spacer layer. The dielectric spacer layer is based, for example, on mica, on $SiO_2$ or on $Al_2O_3$. A preferred example is a multilayer arrangement with the layer sequence semitransparent absorber layer/dielectric spacer layer/reflective layer, e.g. a $Cr/SiO_2/Al$ multilayer arrangement. Pigments with a thin-film interference layer structure can also have a five-layer structure such as the layer sequence semitransparent absorber layer/dielectric spacer layer/reflective layer/dielectric spacer layer/semitransparent absorber layer, e.g. a $Cr/SiO_2/Al/SiO_2/Cr$ multilayer arrangement or an $Al/SiO_2/Al/SiO_2/Al$ multilayer arrangement, wherein in the case of the $Al/SiO_2/Al/SiO_2/Al$ multilayer arrangement the central Al layer has a greater layer thickness than each of the two terminal Al layers.

Further, an additional, magnetic layer can be produced within the multilayer arrangement in order to provide magnetically orientable pigments in this manner.

BRIEF DESCRIPTION OF THE DRAWINGS

Further embodiment examples as well as advantages of the invention will be explained hereinafter with reference to the figures, in whose representation a rendition that is true to scale and to proportion has been dispensed with in order to increase the clearness.

There are shown.

DETAILED DESCRIPTION OF VARIOUS EMBODIMENTS

FIGS. 1 to 4 each illustrate, in cross-sectional views, the manufacture according to the invention of platelet-shaped effect pigments 5 in accordance with an exemplary embodiment.

Figure 1:
FIGS. 1-4 a manufacture of platelet-shaped effect pigments according to the invention.

According to FIG. 1, a carrier substrate 1 is provided, in the example a polyethylene terephthalate (PET) foil.

Figure 2:
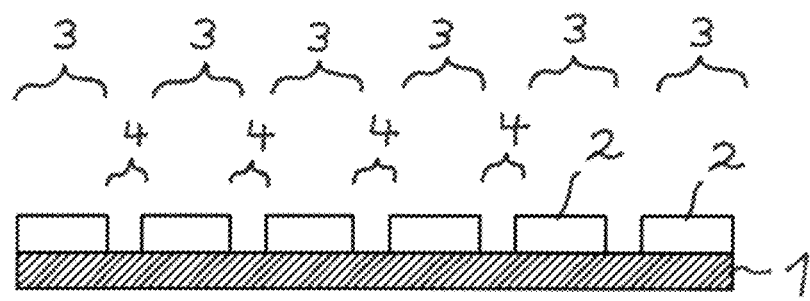

According to FIG. 2, the controlled application by printing technology of aqueous washing ink droplets 2 takes place on the carrier substrate 1 in first regions 3 forming a first motif. In second regions 4 forming a second motif, no washing ink droplets 2 are applied.

Figure 3:
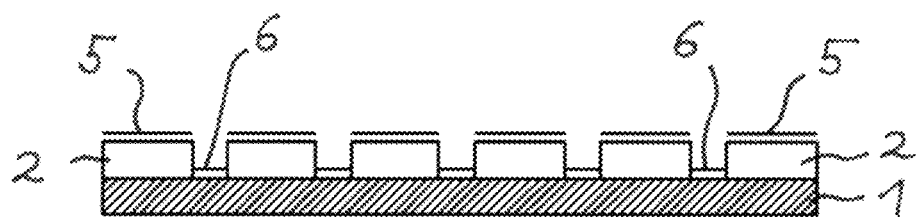

According to FIG. 3, the application of a reflective coating (5, 6), e.g. a metallization or an interference layer structure, to the carrier substrate 1 takes place, so that in second regions 4 forming a second motif outside the first regions 3 forming a first motif, a reflective coating 6 is deposited on the carrier substrate 1 in the form of a regular, contiguous grid, wherein the regions 3 forming a first motif and having the washing ink droplets 2 form regular islands within the regular, contiguous grid. In the first regions 3 forming a first motif, reflective coating 5 is deposited above the washing ink droplets 2.

Subsequently, the removal of the washing ink droplets 2 takes place in the first regions 3 together with the reflective coating 5 present thereon by washing out with a suitable washing solution (see product "B" in FIG. 4). The platelet-shaped effect pigments 5 are subsequently isolated.

Figure 4:
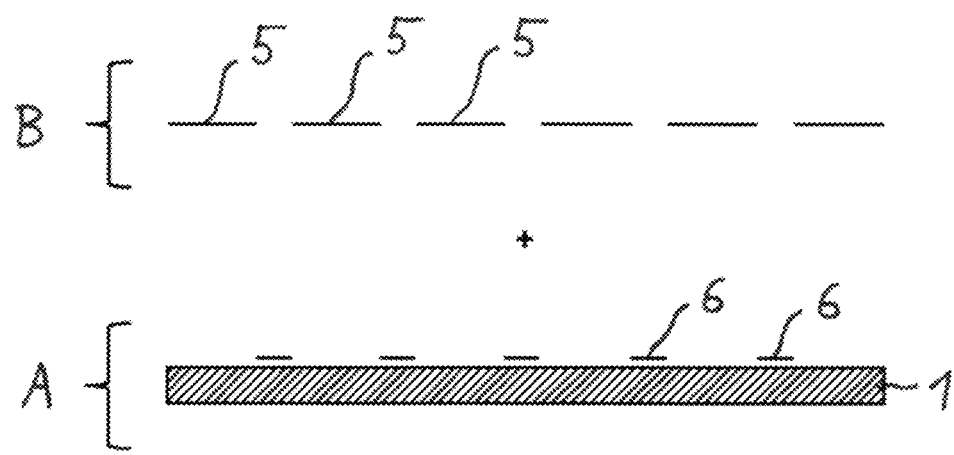

What remains is the product "A" shown in FIG. 4, namely the carrier substrate 1, which has a reflective coating 6 in the form of a regular, contiguous grid only in the second regions 4 forming a second motif.

Figure 5:
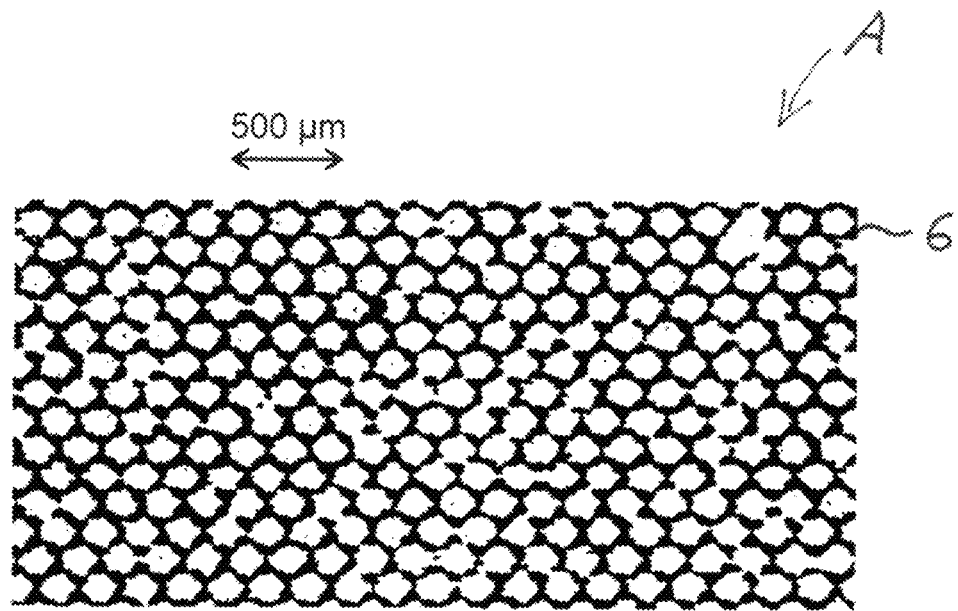
FIG. 5 a grid of reflective coating remaining after a first manufacture according to the invention, magnified 25 times.

FIG. 5 shows the image of a remaining grid "A" of reflective coating 6, magnified 25 times. The manufacture took place employing a gravure printing plate having cells. The washing ink used for the application by printing technology of aqueous washing ink droplets was based on the binding agent polyvinyl pyrrolidone. After the vapor deposition of a metallization, in the example an Al layer, the step of washing out with an aqueous washing solution took place. A transparent, conductive metallization in the form of a regular, contiguous grid remained on the carrier substrate, in the example a polyethylene terephthalate (PET) foil. In FIG. 5 the targeted guiding of the metal lines can be recognized, which reflect the webs of the gravure printing plate employed in the manufacture, and the regular islands, which reflect the platelet-shaped effect pigments produced (see reference number 5 in FIG. 4).

Figure 6:
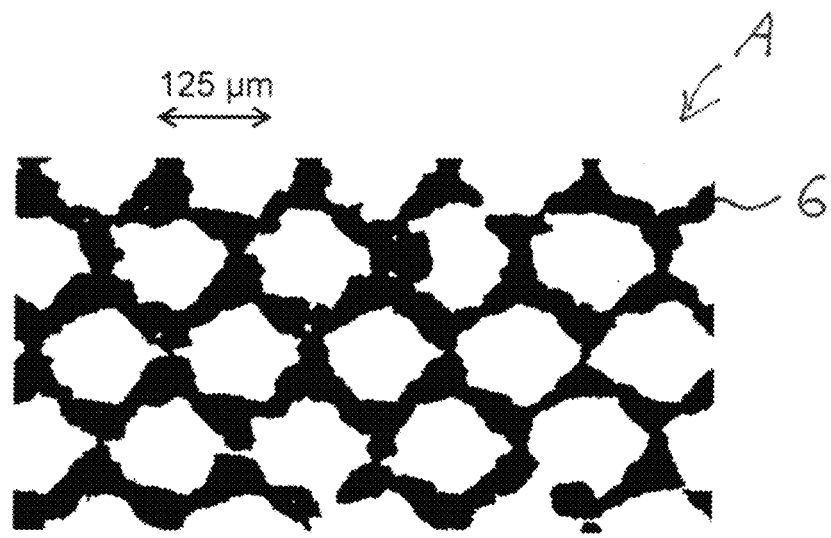
FIG. 6 the grid of reflective coating remaining after a first manufacture according to the invention, magnified 100 times.

FIG. 6 shows the image of the remaining grid "A" of reflective coating 6 enlarged 100 times in plan view.

Figure 7:
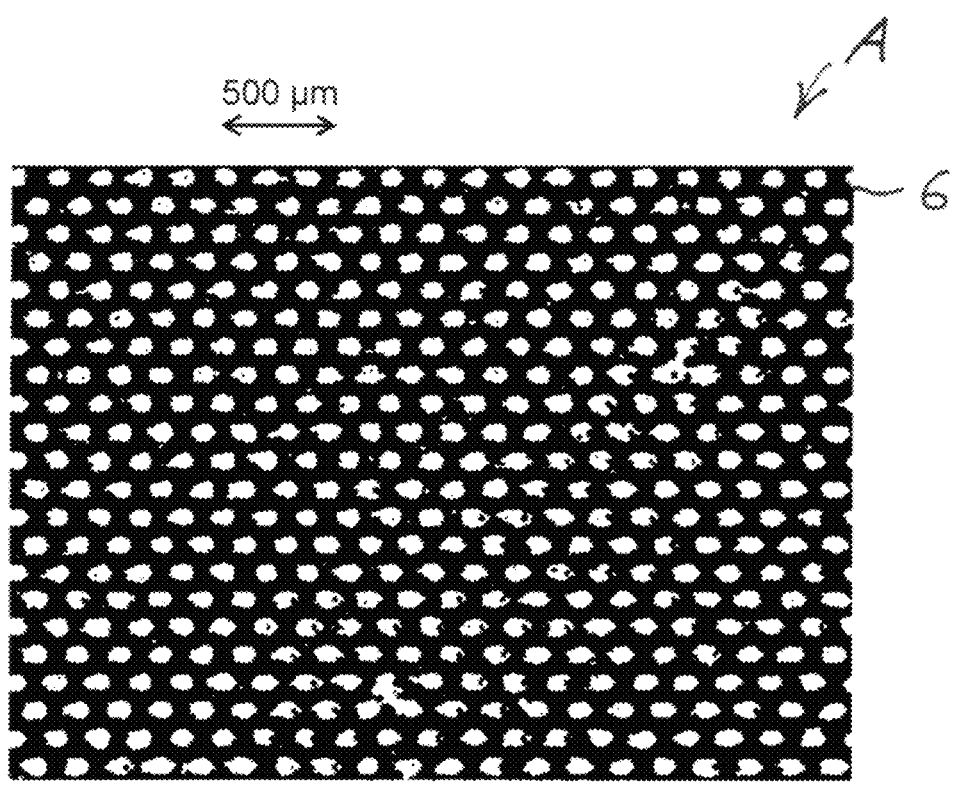
FIG. 7 a grid of reflective coating remaining after a second manufacture according to the invention, magnified 25 times.

FIG. 7 shows a grid "A" of reflective coating 6 that remains after a second manufacture according to the invention, magnified 25 times. Platelet-shaped effect pigments (see reference number 5 in FIG. 4) were obtained substantially according to the same production method as above with reference to FIGS. 5 and 6, wherein this time a different gravure printing plate having a larger web width was used for the application by printing technology of aqueous washing ink droplets 2. In FIG. 7 the targeted guiding of the metal lines can be recognized, which reflect the webs of the gravure printing plate employed in the manufacture, and the regular islands, which reflect the platelet-shaped effect pigments produced (see reference number 5 in FIG. 4).

Figure 8:
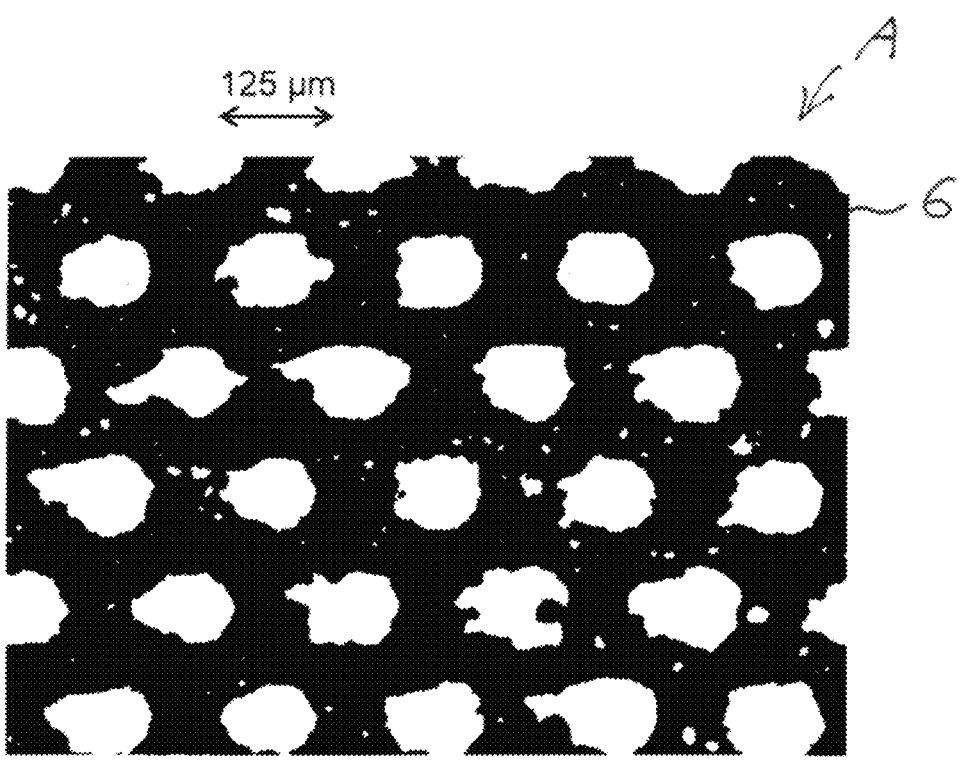
FIG. 8 the grid of reflective coating remaining after the second manufacture according to the invention, magnified 100 times.

FIG. 8 shows the image of the grid "A" of reflective coating 6 that remains after the second manufacture according to the invention, magnified 100 times in plan view.

The invention claimed is:

1. A method for manufacturing platelet-shaped effect pigments, comprising the following steps of:
    a) providing a carrier substrate;
    b) applying by printing technology in a controlled manner aqueous washing ink droplets to the carrier substrate in first regions forming a first motif;
    c) applying a reflective coating to the carrier substrate, so that
        in second regions forming a second motif outside the first regions forming a first motif, reflective coating is deposited on the carrier substrate in the form of a regular, contiguous grid,
        wherein the first regions forming a first motif and having the washing ink droplets form regular islands within the regular, contiguous grid;
        in the first regions forming a first motif, reflective coating is deposited above the washing ink droplets;
    d) removing the washing ink droplets in the first regions together with the reflective coating present thereon and isolating the removed reflective coating in the form of platelet-shaped effect pigments,
        wherein the remaining carrier substrate has a reflective coating in the form of a regular, contiguous grid only in the second regions forming a second motif.

2. The method according to claim 1, wherein step b), applying by printing technology in a controlled manner aqueous washing ink droplets to the carrier substrate in first regions forming a first motif, takes place by means of a printing cylinder having a cell grid or a printing plate having a cell grid,
    wherein the geometry of the platelet-shaped effect pigments produced in the method is determined by a suitable choice of the parameters of cell arrangement, areal cell geometry, cell depth and web width.

3. The method according to claim 2, wherein the printing cylinder or the printing plate has a plurality of different cell grid regions,
    wherein the cell grid regions differ from one another in at least one of the parameters of cell arrangement, areal cell geometry, cell depth and web width, so that the platelet-shaped effect pigments produced in the method have a plurality of platelet-shaped effect pigments with different geometries corresponding to the plurality of different cell grid regions.

4. The method according to claim 1, wherein the aqueous washing ink droplets in step b) are based on an aqueous washing ink having a binding agent,
    wherein the binding agent is a polymer chosen from the group composed of hydroxyethyl cellulose, hydroxypropyl cellulose, carboxymethyl cellulose, polyvinyl alcohol, polyvinyl pyrrolidone, polyethylene glycol and casein.

5. The method according to claim 1, wherein between the steps b) and c) a drying of the aqueous washing ink droplets applied to the carrier substrate is carried out.

6. The method according to claim 1, wherein in step a) a foil is provided as the carrier substrate.

7. The method according to claim 1, wherein the reflective coating applied in step c), and thus each of the platelet-shaped effect pigments isolated in step d), is a metallization chosen from the group composed of aluminum, stainless steel, nichrome, gold, silver, platinum and copper.

8. The method according to claim 1, wherein the reflective coating applied in step c), and thus each of the platelet-shaped effect pigments isolated in step d), has a multilayer arrangement with the following layer sequence:
    semi-transparent absorber layer/dielectric spacer layer/reflective layer; or
    semi-transparent absorber layer/dielectric spacer layer/reflective layer/dielectric spacer layer/semitransparent absorber layer.

9. The method according to claim 8, wherein the reflective coating applied in step c), and thus each of the platelet-shaped effect pigments isolated in step d), has the multilayer arrangement with the layer sequence semitransparent absorber layer/dielectric spacer layer/reflective layer, of Cr/SiO2/Al.

10. The method according to claim 8, wherein the reflective coating applied in step c), and thus each of the platelet-shaped effect pigments isolated in step d), has the multilayer arrangement with the layer sequence semitransparent absorber layer/dielectric spacer layer/reflective layer/dielectric spacer layer/semitransparent absorber layer, namely a of Cr/SiO2/Al/SiO2/Cr or of Al/SiO2/Al/SiO2/Al, wherein the central Al layer of the Al/SiO2/Al/SiO2/Al multilayer arrangement has a greater layer thickness than each of the two terminal Al layers.

\* \* \* \* \*